(12) United States Patent
Kim et al.

(10) Patent No.: US 12,366,921 B2
(45) Date of Patent: Jul. 22, 2025

(54) METHOD FOR RECOGNIZING BLINK AND EYEBALL MOVEMENT BASED ON EEG AND SYSTEM THEREOF

(71) Applicants: AGENCY FOR DEFENSE DEVELOPMENT, Daejeon (KR); KOREA INSTITUTE OF SCIENCE AND TECHNOLOGY, Seoul (KR)

(72) Inventors: Laehyun Kim, Seoul (KR); Yaeeun Han, Seoul (KR); Jihyeon Ha, Seoul (KR)

(73) Assignees: AGENCY FOR DEFENSE DEVELOPMENT, Daejeon (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 18/416,665

(22) Filed: Jan. 18, 2024

(65) Prior Publication Data

US 2024/0241581 A1    Jul. 18, 2024

(30) Foreign Application Priority Data

Jan. 18, 2023    (KR) .................. 10-2023-0007625

(51) Int. Cl.
  *G06F 3/01*    (2006.01)
(52) U.S. Cl.
  CPC .................. *G06F 3/015* (2013.01)
(58) Field of Classification Search
  CPC ....... G06F 3/015; A61B 5/1103; A61B 5/163; A61B 5/291; A61B 5/398; A61B 5/6814; A61B 5/7264
  See application file for complete search history.

(56) References Cited

U.S. PATENT DOCUMENTS 5,360,971 A * 11/1994 Kaufman ............... A61B 3/113
  250/221
7,599,735 B2 * 10/2009 Viertio-Oja ............ A61B 5/398
  600/545

(Continued)

FOREIGN PATENT DOCUMENTS

JP   2022-95462 A    6/2022
KR   10-2022-0063952 A    5/2022
KR   10-2022-0133470 A    10/2022

OTHER PUBLICATIONS

Abdelkader Nasreddine Belkacem et al., "ClasClassification of Four Eye Directions from EEG Signals for Eye-Movement-Based Communication Systems," Journal of Medical and Biological Engineering, 2014, pp. 581-588, vol. 34(6).

(Continued)

*Primary Examiner* — Rodney Amadiz

(57) ABSTRACT

A method for recognizing blink and eye movement based on electroencephalogram (EEG) and a system thereof are disclosed. The method includes measuring a subject's EEG-based electrooculogram (EOG) signal (hereinafter referred to as "EOG signal") using three electrodes connected to an EEG head cap. The method further includes performing potential blink detection and zero crossing detection using the EOG signal, and generating a plurality of parameters used for blink and eye movement classification using the EOG signal depending on presence or absence of the potential blink and the zero crossing. In addition, the method further includes classifying the blink and up/down/left/right eye movements of using the plurality of parameters.

14 Claims, 5 Drawing Sheets

(56) References Cited

U.S. PATENT DOCUMENTS

| | | | | |
|---|---|---|---|---|
| 2019/0192068 A1* | 6/2019 | Tsoneva | .................. | A61B 5/374 |
| 2022/0199245 A1* | 6/2022 | Wipperman | ........... | A61B 5/163 |
| 2023/0029255 A1* | 1/2023 | Qian | .................... | A61B 5/4812 |
| 2023/0337961 A1* | 10/2023 | Sarlija | .................. | A61B 5/4088 |

OTHER PUBLICATIONS

Jaehwan Ryu et al., "EOG-based eye tracking protocol using baseline drift removal algorithm for long-term eye movement detection," Expert Systems With Applications, 2019, pp. 275-287, vol. 131.

* cited by examiner

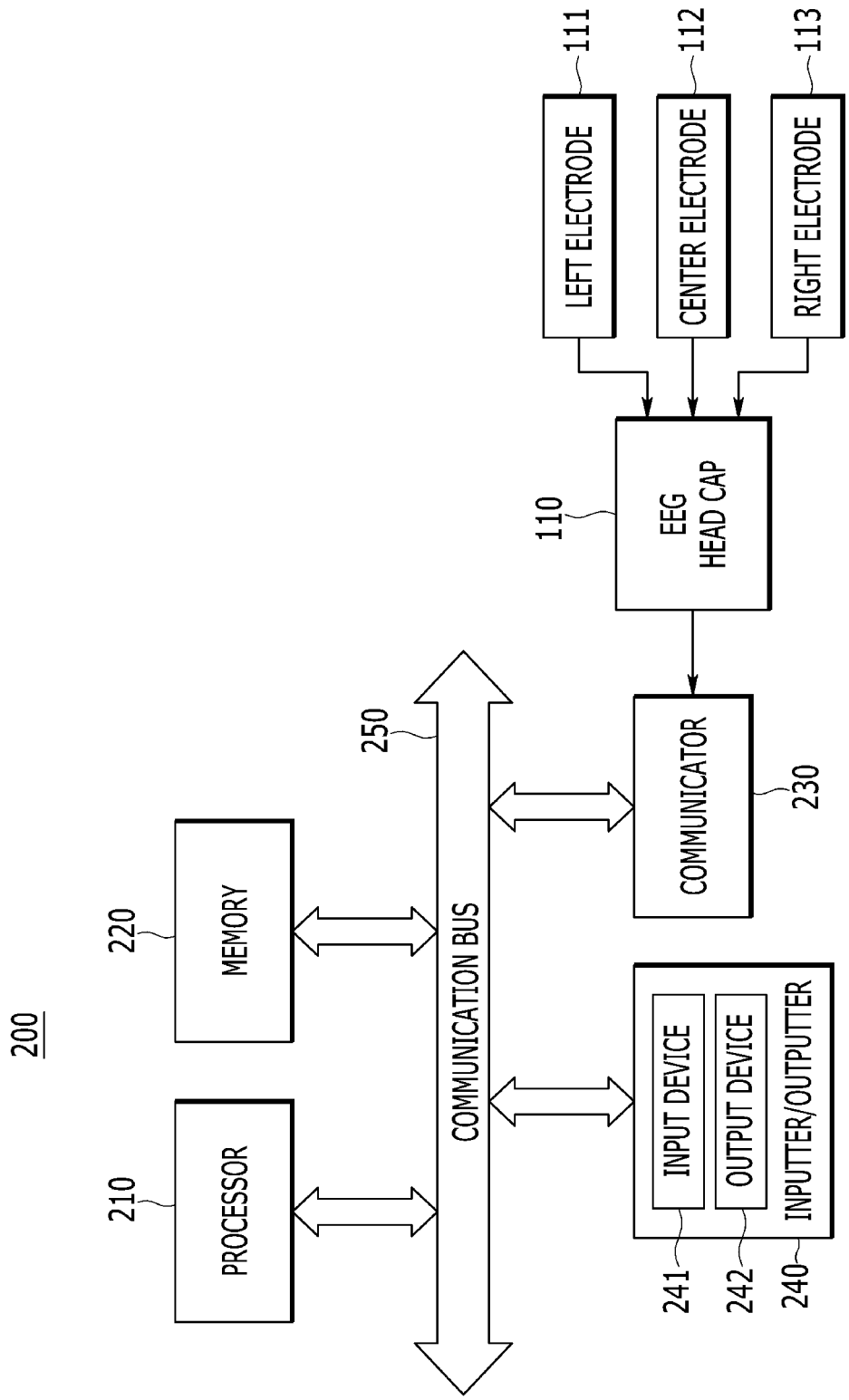

METHOD FOR RECOGNIZING BLINK AND EYEBALL MOVEMENT BASED ON EEG AND SYSTEM THEREOF

CROSS-REFERENCE TO RELATED APPLICATION

This application claims priority to and the benefit of Korean Patent Application No. 10-2023-0007625 filed in the Korean Intellectual Property Office on Jan. 18, 2023, the entire contents of which are incorporated herein by reference.

BACKGROUND OF THE INVENTION (a) Field of the Invention

This application claims priority to and the benefit of Korean Patent Application No. 10-2023-0007625 filed in the Korean Intellectual Property Office on Jan. 18, 2023, the entire contents of which are incorporated herein by reference.

The present disclosure relates to a method for recognizing blink and eye movement based on electroencephalogram (EEG) and a system thereof.

(b) Description of the Related Art

Electrooculogram (EOG) is an electrical signal that measures electrophysiological changes related to eye movement and is a signal derived from corneo-retinal potential (CRP).

The corresponding potential change may be measured through corneo, which accesses horizontal and vertical electrodes located around eyes, and thus, predict eye movement.

Currently, the EOG is used as data for detecting artifacts to remove noise and controlling external devices for patients with impaired movement, and has been active in the field of a brain-computer interface (BCI).

In particular, the classification and detection of user's voluntary blink and eye movement may be interpreted as control commands such as 'select' and 'movement' in the BCI.

However, since blink occurs in the same EOG signal as vertical eye movement and has a similar waveform, classification errors may occur.

Combining the BCI with a visual platform such as augmented reality (AR) provides free eye movement, enabling real-life BCI to escape the controlled laboratory environment, but the free eye movement has many variables for up/down/left/right eye movement, reducing the classification accuracy of the control commands through the EOG.

In addition, facial attachment of an EOG sensor and additional use of an image-based eye movement tracking device may cause discomfort to a BCI user, and EOG sensors may obscure some of user's viewing angles, causing performance degradation based on a visual paradigm.

Meanwhile, an electroencephalogram (EEG) signal including frequencies lower than 1 Hz directly represent patterns of slow-varying transient activities that occur due to eye or body movement, etc. This is called baseline drift, and high-pass filtering is used as a representative baseline removal. However, as a cutoff frequency changes, the EOG signal with a fast and sharp waveform may be distorted.

SUMMARY OF THE INVENTION

The present disclosure attempts to provide a method for recognizing blink and eye movement based on electroencephalogram (EEG) and a system thereof capable of classifying blink and eye movement by using only three prefrontal electrodes of an EEG head cap used in a brain-computer interface (BCI).

Characteristic configurations of the present disclosure for accomplishing the objects of the present disclosure as described above and unique effects of the present disclosure to be described will be described below.

According to an aspect of the present disclosure, there is provided a method for recognizing blink and eye movement.

The method for recognizing, by a system for recognizing blink and eye movement, blink and eye movement based on electroencephalogram (EEG) includes measuring a subject's EEG-based electrooculogram (EOG) signal (hereinafter referred to as "EOG signal") using three electrodes connected to an EEG head cap, performing potential blink detection and zero crossing detection using the EOG signal, generating a plurality of parameters used for blink and eye movement classification using the EOG signal depending on presence or absence of the potential blink and the zero crossing, and classifying the blink and upper/lower/left/right eye movements using the plurality of parameters.

The three electrodes may include one center electrode attached to a center of a prefrontal lobe of a cerebral lobe of a subject's brain, one left electrode attached to a left side of the prefrontal lobe, and one right electrode attached to a right side of the prefrontal lobe.

The method may further include applying an envelope based baseline correction to the EOG signal between the measuring of the EOG signal and the performing of the zero crossing detection.

The generating of the plurality of parameters may include determining whether there is a potential blink index, and generating seven parameters when there is the potential blink index, or generating five parameters when there is no potential blink index.

When the center electrode is defined as F1, the left electrode is defined as F2, the right electrode is defined as F3, and an average value of F2 and F3 is defined as FT, the seven parameters may include a parameter representing a variance of the F1 and FT, a parameter representing a correlation between the F2 and F3, a parameter representing a correlation between the F1 and F2 or F3, a parameter representing a down variance of the F1 and FT, a parameter representing a trapezoidal rule of the F1, F2 and F3, a parameter representing maximum and minimum values of the F1 and an index, and a parameter representing a total sum of the F2 and F3.

When the center electrode is defined as F1, the left electrode is defined as F2, the right electrode is defined as F3, and an average value of F2 and F3 is defined as FT, the five parameters may include a parameter representing a correlation between the F2 and F3, a parameter representing a down variance of the F1 and FT, a parameter representing maximum and minimum values of the F1 and an index, a parameter representing a maximum difference value between the F2 and F3 and the index, and a parameter representing a total sum of the F2 and F3.

In the classifying of the blink and the up/down/left/right eye movements, the blink, the upper eye movement, and the lower eye movement may be classified using the parameter representing the variance of the F1 and FT, the parameter representing the correlation between the F1 and F2 or F3, a parameter representing a down variance of the F1 and FT, the parameter representing the trapezoidal rule of the F1, F2, and F3, and the parameter representing the maximum and minimum values of the F1 and the index.

The left eye movement and the right eye movement may be classified using the parameter representing the variance of the F1 and FT, the parameter representing the correlation between the F2 and F3, and the parameter representing the total sum of the F2 and F3.

The classifying of the upper/lower/left/right eye movements may further include determining whether there is the index of the zero crossing, and when there is the index of the zero crossing, the left eye movement and the right eye movement may be classified using the parameter representing the total sum of the F2 and F3.

When there is no index of the zero crossing, the upper eye movement, the lower eye movement, the left eye movement, and the right eye movement may be classified using the parameter representing the correlation between the F2 and F3, the parameter representing the down variance of the F1 and FT, the parameter representing the maximum and minimum values of the F1 and the index, the parameter representing the maximum difference value between the F2 and F3 and the index, and the parameter representing the total sum of the F2 and F3.

According to another aspect of the present disclosure, there is provided a system for recognizing blink and eye movement.

The system for recognizing blink and eye movement based on electroencephalogram (EEG) includes three electrodes attached to a prefrontal lobe of a cerebral lobe of a subject's brain to measure a subject's EEG-based electrooculogram (EOG) signal (hereinafter referred to as "EOG signal"), an EEG head cap connected to the three electrodes and transmitting the EOG signal measured through the three electrodes to an outside through wired or wireless communication, and a recognition device performing potential blink detection and zero crossing detection using the EOG signal transmitted from the EEG head cap, generating a plurality of parameters used for the blink and eye movement classification using the EOG signal depending on presence or absence of the potential blink and the zero crossing, and classifying the blink and up/down/left/right eye movements using the plurality of parameters.

The three electrodes may include one center electrode attached to a center of the prefrontal lobe, one left electrode attached to a left side of the prefrontal lobe, and one right electrode attached to a right side of the prefrontal lobe.

The recognition device may include a processor and a memory, the memory may be configured to store a set of codes, and the code may be used to control the processor to execute a process of performing potential blink detection and zero crossing detection using the EOG signal transmitted from the EEG head cap, a process of generating a plurality of parameters used for the blink and eye movement classification using the EOG signal depending on presence or absence of the potential blink and the zero crossing, and a process of classifying the blink and up/down/left/right eye movements using the plurality of parameters.

The code may be used to control the processor to further execute a process of determining whether there is the potential blink index, and a process of generating seven parameters when there is the potential blink index, or, generating five parameters when there is no potential blink index.

According to the present disclosure, no separate calibration process is required, and the blinking and eye movements can be classified using only the three prefrontal lobe electrodes of the EEG head cap used in the BCI.

Therefore, it is possible to provide the convenience to the BCI user and contribute to performance improvement.

In addition, the blink, which is used to correct errors and perform specific commands in the actual BCI, can improve recognition errors that occur due to waveform patterns similar to other eye movements.

In addition, the use of the EEG sensor-based EOG can eliminate the inconvenience of attaching the additional EOG electrodes, and provide convenience to the BCI user by replacing the existing image-based eye tracking technology.

BRIEF DESCRIPTION OF THE DRAWINGS

FIG. 5 is a schematic flowchart of a method for recognizing blink and eye movement based on electroencephalogram (EEG) according to an embodiment of the present disclosure.

DETAILED DESCRIPTION OF THE EMBODIMENTS

Figure 1:
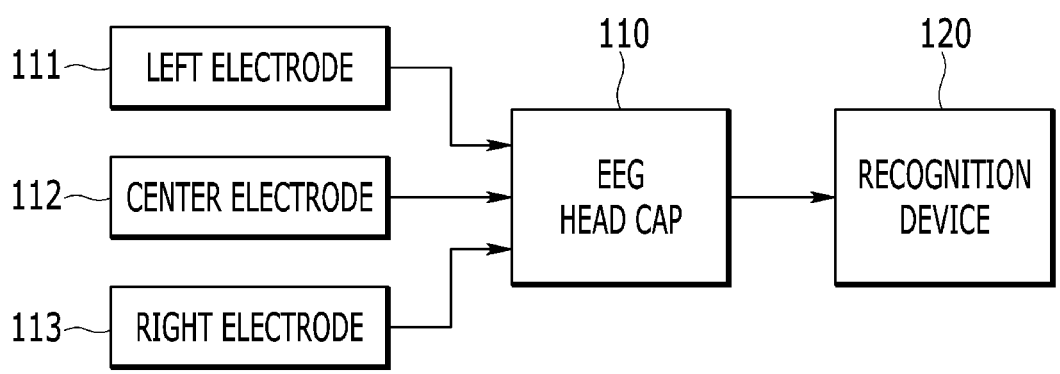
FIG. 1 is a schematic configuration diagram of a device for recognizing blink and eye movement based on electroencephalogram (EEG) according to an embodiment of the present disclosure.

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms and is not limited to exemplary embodiments provided herein.

Portions unrelated to the description will be omitted in order to obviously describe the present disclosure, and same or similar components will be denoted by the same reference numerals throughout the present specification.

In addition, unless explicitly described to the contrary, the word "comprise", and variations such as "comprises" or "comprising", will be understood to imply the inclusion of stated elements but not the exclusion of any other elements.

Hereinafter, a method and device for recognizing blink and eye movement based on electroencephalogram (EEG) according to an embodiment of the present disclosure will be described with reference to the drawings.

First, FIG. 1 is a schematic configuration diagram of a device for recognizing blink and eye movement based on electroencephalogram (EEG) according to an embodiment of the present disclosure.

As illustrated in FIG. 1, the system 100 for recognizing blink and eye movement based on EEG (hereinafter referred to as "device for recognizing blink and eye movement") according to an embodiment of the present disclosure includes an EEG head cap 110 to which three electrodes 111, 112, and 113 are connected and a recognition device 120.

The three electrodes 111, 112, and 113 are attached to center, left, and right sides of a prefrontal lobe of a cerebral lobe of a subject's brain, respectively, to measure subject's brain wave signals and transmit the measured subject's brain wave signals to the EEG head cap 110. Specifically, the center electrode 112 is attached to the center of the prefrontal lobe, the left electrode 111 is attached to the left side of the prefrontal lobe, and the right electrode 113 is attached to the right side of the prefrontal lobe.

The EEG head cap 110 is an EEG head cap with a 10-20 system of 32 channels or more, and transmits brain wave signals transmitted through three electrodes 111, 112, and 113 to the recognition device 120 by wire or wirelessly. Preferably, the EEG head cap 110 transmits the brain wave signals to the recognition device 120 through the wireless communication.

The recognition device 120 uses EOG (EOG measured from an EEG sensor) caused from one center electrode 112 and bilateral (left and right) electrodes 111 and 113 attached to the prefrontal lobe to recognize the blink and four eye movements (up/down/left/right).

Hereinafter, classifying, by the recognition device 120, the blink and four eye movements (up/down/left/right) using the EEG signal transmitted from the EEG head cap 110, that is, the EOG (EOG measured by EEG sensor) signal will be described.

Figure 2:
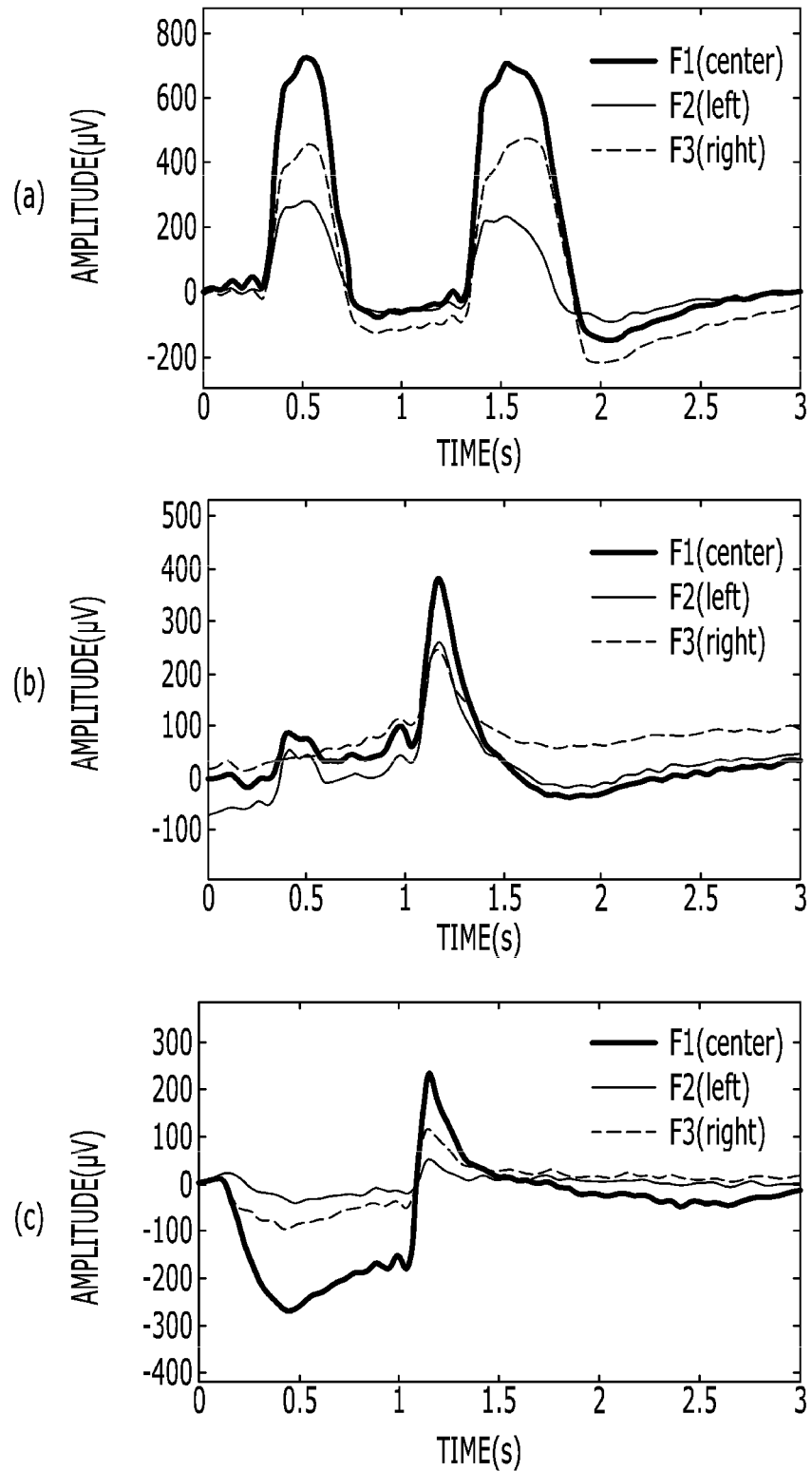
FIG. 2 is a graph illustrating waveforms of blink and up/down eye movements detected from an EEG sensor-based EOG signal according to an embodiment of the present disclosure, where (a) illustrates the case of the blink, (b) illustrates the case of the upper eye movement, and (c) illustrates the case of the lower eye movement.

FIG. 2 is a graph illustrating waveforms of blink and up/down eye movements detected from an EEG sensor-based EOG signal according to an embodiment of the present disclosure, where (a) illustrates the case of the blink, (b) illustrates the case of the upper eye movement, and (c) illustrates the case of the lower eye movement.

Referring to (a) in FIG. 2, the graph corresponding to the blink has a shape similar to a positive (+) curve of a general sine wave, and a peak with the greatest correlation between these two waveforms may be designated as a start point at which the two waveforms match. Therefore, a sinusoidal wave with the same sampling rate as the waveform of (a) in FIG. 2 is formed with a typical blink duration, for example, 300 ms, and a correlation according to a time series between the corresponding signal and the EEG sensor-based EOG signal is calculated. Then, a potential blink index is found through the correlation calculated in this way.

Meanwhile, referring to (a) and (b) in FIG. 2, since the blink ((a) in FIG. 2) and the upper eye movement ((b) in FIG. 2) have similar positive EOG patterns, to classify two patterns, measurement signals from two electrodes 111 and 113 located on both sides of the prefrontal lobe are used.

Since the influence of the side electrodes 111 and 113 due to the blink appears larger in the positive waveform than the influence in the upper eye movement, this difference may be used to classify the blink and upper eye movement.

In addition, referring to (c) in FIG. 2, the lower eye movement generates a negative waveform at the center electrode 112 of the prefrontal lobe, and then generates a positive peak similar to the blink when the eye returns to the center. Therefore, when there is the return to the center after the lower eye movement, the two waveforms are primarily classified based on the blink and upper eye movement start point, and then, the upper and lower eye movements may be classified by comparing the negative waveforms before the corresponding point.

When there is no return to the center of the lower eye movement, classification with the upper eye movement is possible by comparing the difference in magnitude of the negative waveform between the center electrode 112 and the bilateral electrodes 111 and 113 during an EOG acquisition time.

Next, classifying, by the recognition device 120, the left/right eye movements using the brain wave signal transmitted from the EEG head cap 110, that is, the EOG (EOG measured by the EEG sensor) signal will be described.

Figure 3:
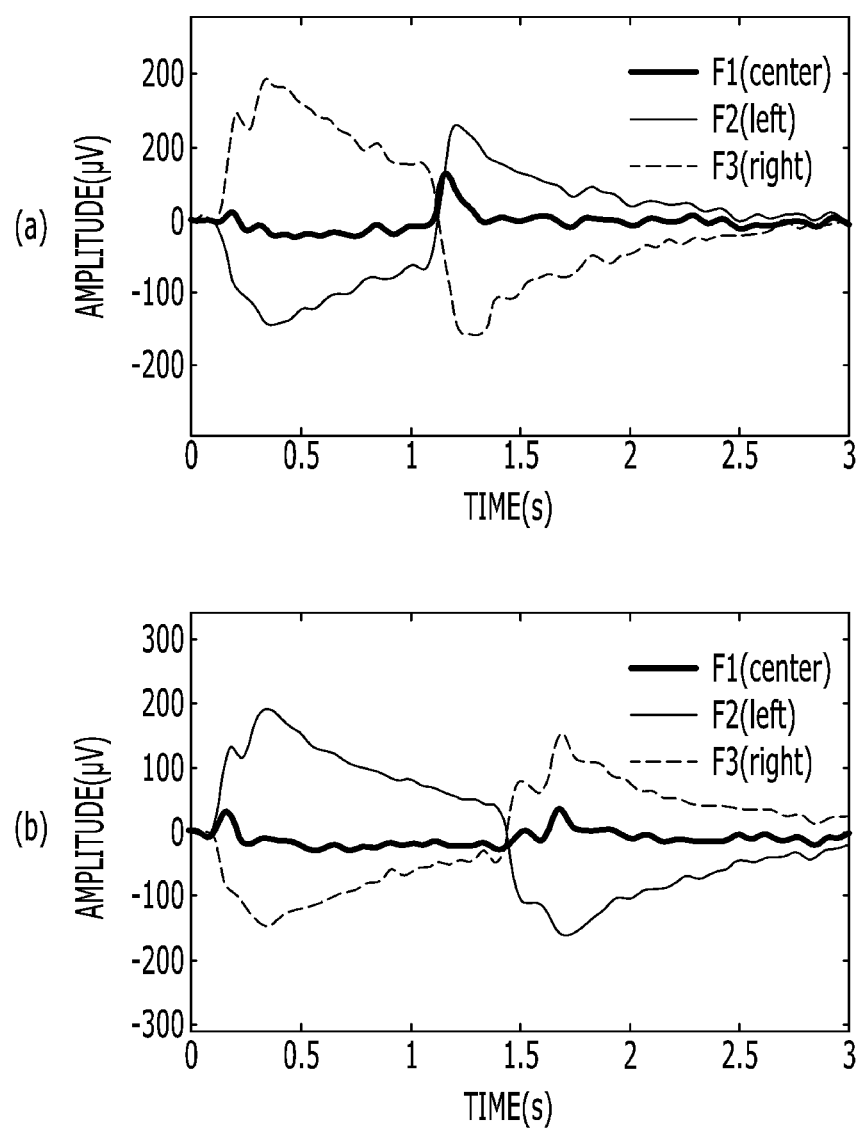
FIG. 3 is a graph illustrating waveforms of left and right eye movements detected from the EEG sensor-based EOG signal according to the embodiment of the present disclosure, where (a) illustrates the case of the right eye movement and (b) illustrates the case of the left eye movement.

FIG. 3 is a graph illustrating waveforms of left and right eye movements detected from the EEG sensor-based EOG signal according to the embodiment of the present disclosure, where (a) illustrates the case of the right eye movement and (b) illustrates the case of the left eye movement.

Referring to (a) and (b) in FIG. 3, the positive waveform starts from the electrodes 111 and 113 on a side that matches the left/right eye movement directions and the negative waveform starts from the electrodes 111 and 113 on the opposite side. That is, referring to (a) in FIG. 3, it can be seen that in the case of the eye movement to the right, the waveform of the electrode 113 on the right side starts with the positive waveform, and conversely, referring to (b) in FIG. 3, in the case of the eye movement to the left, the waveform of the electrode 111 on the left side starts with the positive waveform.

In the case of the left/right eye movements, the EOG signal between the bilateral electrodes 111 and 113 of the prefrontal lobe has a higher negative correlation than the blink and up/down eye movements, so the horizontal movement, that is, the left/right movement may be primarily classified.

When there is the eye movement to both sides followed by the return to the center, a zero crossing occurs in the waveform between the two electrodes. Therefore, starting from a section where the zero crossing occurs, the positions of the side electrodes 111 and 113 where the positive waveform among the front waveforms appears may be set to the eye movement directions.

When there is no return to the center of the eye, the direction of the electrode showing the positive waveform among the bilateral electrodes 111 and 113 during the EOG acquisition time is classified as the eye movement direction.

Hereinafter, a method for detecting the index of the zero crossing described above will be described.

First, indexes of values whose amplitude is greater than −5 are found among the EOG signals measured at the left electrode 111.

Thereafter, a difference value between adjacent indexes is calculated, and the index where the calculated difference value is greater than 1 is found.

The index found in this way indicates that one zero crossing has ended, and the section where the zero crossing occurs is indexed through index ±1 for the index.

Based on this index section, the total sum of signals of each of the left and right electrodes 111 and 113 before 300 ms is calculated, and when the value of the signal of the left electrode 111 is greater, the corresponding index section is designated as an index for the left eye movement.

On the contrary, the total sum of the signals of the left and right electrodes 111 and 113 from 300 ms before is calculated based on the index section, and when the value of the signal of the right electrode 113 is greater, the corresponding index section is specified as the index for the right eye movement.

In addition, to ensure this, the total sum for 1 second from the start of acquiring the EOG signals from the left and right electrodes 111 and 113 is respectively calculated, and the indexes of the zero crossing of the electrodes 111 and 113 where the size of the obtained total is larger are calculated.

Hereinafter, the method for recognizing blink and eye movement based on EEG according to an embodiment of the present disclosure will be described with reference to the drawings.

Figure 4:
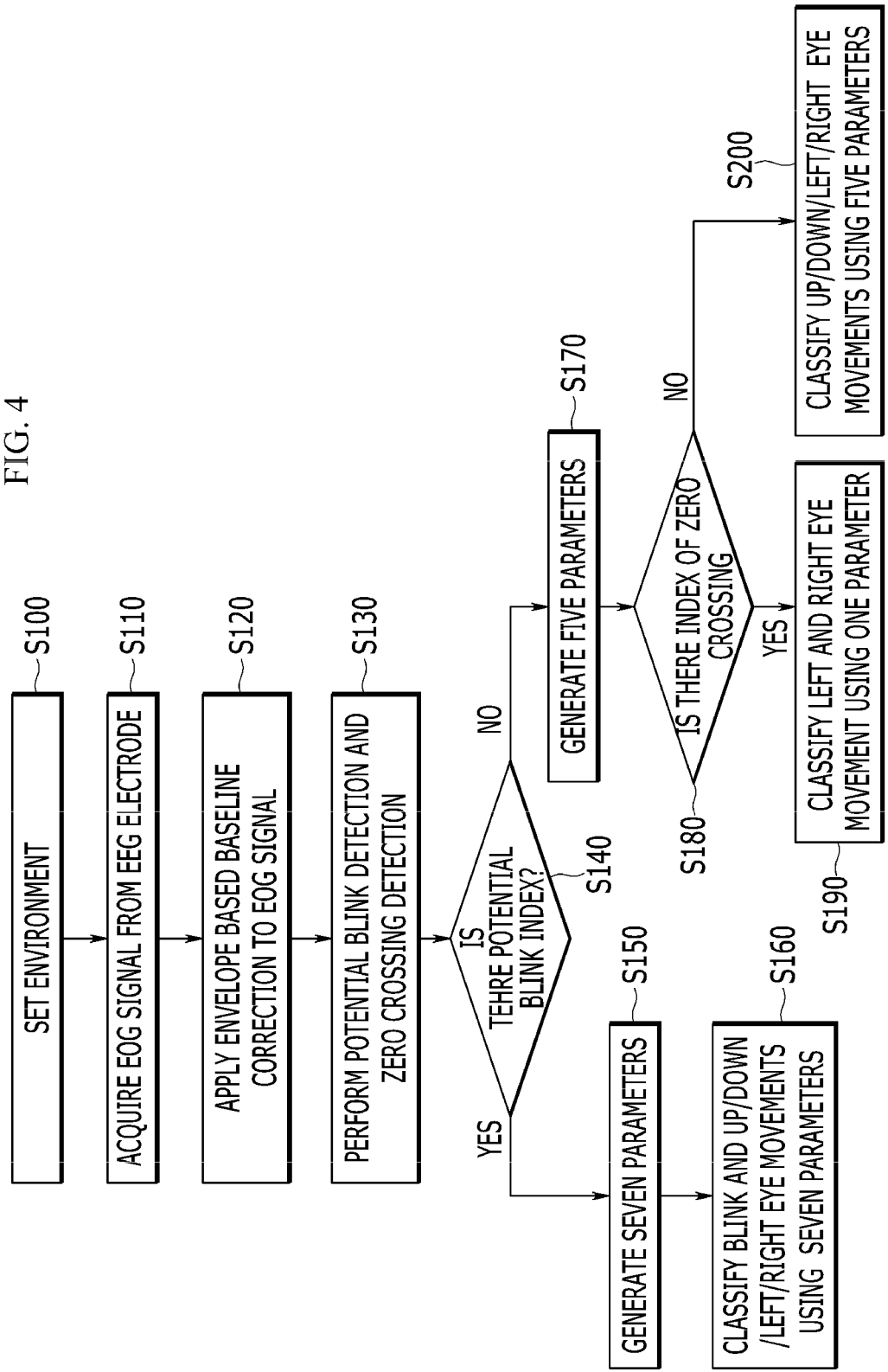
FIG. 4 is a schematic flowchart of a method for recognizing blink and eye movement based on electroencephalogram (EEG) according to an embodiment of the present disclosure.

FIG. 4 is a schematic flowchart of a method for recognizing blink and eye movement based on EEG according to an embodiment of the present disclosure.

First, referring to FIG. 4, an environment for EEG-based blink and eye movement recognition according to an embodiment of the present disclosure is set (S100).

Specifically, an experiment to evaluate blink and eye movement prediction using EEG sensor-based EOG signals is conducted on 3 subjects (3 women, average age 26.33±3.21 years).

Subjects wear an EEG head cap 110 following the 10-20 system, and are subjected to a total of nine eye movement instruction stimuli for upper, lower, left, right, upper right (+45°), lower right (−45°), upper left (+45°), lower left (−45°), and the blink.

While each stimulus is presented 10 times for 3 seconds, subjects perform the eye movements and blink in the same direction as the instruction stimulus.

The subject performs a total of 90 eye movements, and the EEG sensor-based EOG signal (hereinafter referred to as "EOG signal") is acquired from one center electrode 112 of the prefrontal lobe and the two bilateral electrodes (left electrode and right electrode) 111 and 113 connected to the EEG head cap 110 (S110). Here, the EOG signal acquired in this way is subjected to re-referencing through an overall average reference value and band-pass filtering of 0.1 to 10 Hz for future use.

Meanwhile, in an embodiment of the present disclosure, an envelope based baseline correction that minimizes signal loss is applied for the accurate analysis of the EOG signal (S120).

Specifically, abs(x) is calculated so that an absolute value signal starts at the same part as a starting position of an EOG original signal (x).

Envelopes y1 and y2 are calculated along lower peaks that appear every 200 ms of the original signal (x) and abs(x) signals.

An average envelope y3 of two envelopes is calculated.

x(t)−y1(t) and x(t)−y3(t) at each sample point of the signal are obtained.

When a size of x(t)−y3(t) is larger and a value of y3(t) is larger than y1(t), the value of y3(t) is used at a sample point t. Since this case occurs only at the negative peak of the lower eye movement during the eye movement, the loss of the negative waveform may be minimized by using y3(t).

When the above condition is not satisfied but y3(t) is greater than y1(t), y3(t) is used, and when y1(t) is greater than y3(t), y1(t) is used at the sample point t.

At each point t, new data z is output using either y1 or y3.

Because z uses the lower peak envelope every 200 ms, the values of the first and last portions representing the overall change in the EOG signal may be inaccurate. Therefore, by assigning the minimum value between the 100 ms section of the first and last signal to each section, z is made similar to the overall change in data of the original signal (x).

A second-order polynomial w, which is the optimal fitting for the data in z, is calculated.

Finally, the baseline correction is performed using x−w.

Next, the potential blink detection and zero crossing detection are performed using the EOG signal to which the envelope based baseline correction is applied (S130). Here, the blink detection and zero crossing detection are the same as described above, so for brevity of explanation, the explanation is omitted here.

Through the detection in the above step (S130), when there is the potential blink index (S140), seven parameters are generated as follows (S150). Here, for convenience of explanation, a minimum common threshold is used to avoid being influenced by the viewing angle, the subject's EOG signal size, etc., and seven parameters are used to classify the blink and eye movements. In the parameters, the center electrode of the prefrontal lobe is assumed to be F1, the left and right electrodes of the prefrontal lobe are assumed to be F2/F3, respectively, and the average signal value of F2 and F3 is assumed to be FT.

The seven parameters are described below.

(1) Variance F1 and FT

As the parameters for the blink detection, common threshold values of 2e+4 and 1e+3 are applied, respectively. A staying potential of an eye measured from electrodes is 500 μV, and the variance 2e+4 calculated at this time is used as a variance threshold of F1. In addition, FT is less affected by blink than F1, but is greater than 100 μV, which is the amplitude of the EOG signal (0.1 to 10 Hz) measured with electrodes. Therefore, the variance 1e+3 is used as the threshold for the FT.

(2) Correlation Between F2 and F3

The waveforms of F2 and F3 have a negative correlation in the left/right eye movements. In the case of the left/right eye movements, when there is a return to the center, it may be determined as the blink point. Therefore, the correlation between F2 and F3 after 500 ms is calculated based on the corresponding point.

(3) Correlation Between F1 and F2/F3

In the case of the upper/lower eye movements, the bilateral electrodes 111 and 113 are also affected and formed into a waveform like F1. The correlation up to 300 ms is calculated based on the potential blink point.

(4) Down Variance F1 and FT

In case of the lower eye movement, the F1 appears as a large negative waveform. The variance threshold of the negative waveform smaller than 0 uses 1e+3, which is the same as the variance threshold of FT presented in (1). When the return to the center occurs in the lower eye movement, the positive peak may occur and the error in recognition may occur at the blink point. Therefore, when the corresponding point exists, the variance of the waveform composed of values less than 0 in the previous section is obtained based on the point.

(5) Trapezoidal Rule F1, F2 and F3

When there is the potential blink point but is not classified as the blink, the trapezoidal rule is applied to F1, F2, and F3 to classify into the upper eye movement. The integral of each data up to 300 ms is calculated based on the corresponding point.

(6) Maximum and Minimum Values of F1 and Index

It is a parameter that classifies the upper/lower eye movements, and it finds the maximum value in the F1 data up to 300 ms based on the potential blink point and calculates the index. When the maximum value of the F1 is greater than the values of the F2 and F3 at the corresponding index, it is assumed to be either upper or lower movement. In the case of the lower eye movement, when there is the return to the center, it should be included as a classification result in the corresponding condition because it has a similar waveform to the upper eye movements. In addition, the minimum value is found in the F1 data before 300 ms based on the corresponding point, and the index is calculated.

(7) Total Sum of F2 and F3

When there is the potential blink point, it is assumed that there is the return to the center in the left/right eye movements, and the total sum of F2 and F3 for the previous 300 ms from the corresponding point is calculated respectively.

Next, the blink and upper/lower/left/right eye movements are classified using the seven parameters described above (S160). For example, the classification of the blink and up/lower eye movements may be made using parameters (1), (3), (4), (5), and (6), and the classification of the left/right eye movements may be made using parameters (1), (2), and (7).

However, through the detection in the above step (S130), when it is determined that there is no potential blink index (S140), the five parameters are generated as follows (S170).

Hereinafter, the five parameters are described below.

(1) Correlation Between F1 and F3

The waveforms of F2 and F3 have a negative correlation in the left/right eye movements. When there is no potential blink point, the correlation for the entire data of the F2 and F3 is calculated.

(2) Down Variance F1 and FT

In case of the lower eye movement, the F1 appears as a large negative waveform. When there is no potential blink point, the variance of the negative waveform less than 0 is calculated from the entire data.

(3) Maximum and Minimum Values of F1 and Index

When there is no potential blink point, the maximum value is found in the entire F1 data and compared to the values of the F2 and F3 at the corresponding index to classify the upper/lower eye movements.

(4) Maximum Difference Value Between F2 and F3 and Index

As the parameter for classifying the eye movement when there is no potential blink point, it is determined that the eye movement occurred when the waveform difference between the F2 and F3 is the largest, and the sizes of the F1 value and F2 and F3 values at the corresponding index are compared. Through this, the classification of the upper/lower direction and the left/right is performed.

(5) Total Sum of F2 and F3

When there is no potential blink point and there is the index of the zero crossing, the total sum of F2 and F3 for the previous 300 ms is calculated based on the corresponding index. When both the indexes are not present, the total sum of F2 and F3 from the beginning to half of the entire data is calculated.

Next, it is determined whether there is the index of the zero crossing index (S180), and when there is the index of the zero crossing, it is classified as either the left or right eye movement by using the above-described parameter (5) (S190).

However, when it is determined in step S180 that there is no index of the zero crossing, it is classified as one of the upper/lower/left/right eye movement using the parameters (1), (2), (3), and (4) (S200).

Hereinafter, the accuracy results of five types of classification of the blink and eye movement will be described through experiments in the environment for recognizing the blink and eye movement based on the EEG described above.

As described above, three subjects are subjected to a total of nine eye movement instruction stimuli, and the EEG sensor-based EOG signals (one center electrode 112 of the prefrontal lobe and two bilateral electrodes 111 and 113) are acquired while performing the instructions.

Thereafter, the blink and eye movement classification is performed according to the above-described method for recognizing blink and eye movement based on EEG.

First, the accuracy for which all right (0°, ±45°) directions is predicted to be right is calculated, and the accuracy for which all left (0°, ±45°) directions is predicted to be left is calculated.

The average of the classification accuracies of five types of blink and eye movements for three subjects is as follows. The upper eye movement (90%), the lower eye movement (93.3%±11.5), the right eye movement (0°±45°, 95.6%±5.3), the left eye movement (0°±45°, 96.7%±7.1), and the blink (93.3%±5.8).

The overall detection accuracy for each subject is subject 1 (91.1%±5.7), subject 2 (97.8%±4.2), and subject 3 (95.6%±6.8), and the average detection accuracy is 94.8%±5.6.

Similarly, in the conventional research 1, the upper/lower/left/right eye movements are compared using 16 frontal lobe EEG sensors, and common and individually optimized thresholds are applied between subjects.

In the two cases described above, the accuracy is 62.6%±11.3 and 64.9%±9.6, respectively, and it is confirmed that the classification accuracy performance of the present disclosure is higher in a total of 5 types of classification accuracy up to the blink.

In addition, the conventional study 2 slightly modifies the position of the EOG sensor attached to a face to produce a glass-type EOG sensor and calculate the upper/lower/left/right eye movements and blink classification accuracy. In addition, a new baseline correction called differential EOG signal based on fixation curve (DOSbFC) is proposed. The average classification accuracy of 20 subjects is calculated, and the accuracy when applying the DOSbFC method is 94%.

Although it showed similar classification performance to the present disclosure, additional attachment of the EOG sensor is required. In addition, when the baseline correction is performed by applying the DOSbFC to the EEG sensor-based EOG signal, the distortion occurs in the signal, making it impossible to classify it using the algorithm of the present disclosure. In addition, initial calibration was necessary to specify a specific voltage for each subject. Therefore, when comparing the two studies with the present disclosure, it may be confirmed that the performance of the present disclosure is higher.

Next, the baseline correction performance comparison results will be described.

To confirm the performance of the envelope based baseline correction proposed in the present disclosure, the average classification accuracy of the blink and eye movement of three subjects for bandpass filtering (1 to 10 Hz), detrending, and wavelet transform along with the envelope based on the baseline correction method is calculated. In addition, the application of the DOSbFC causes the distortion of the EEG-based EOG signal, and therefore, is excluded from the application of the classification algorithm proposed in the present disclosure.

The average accuracy for the four methods is as follows:

Envelope method based on baseline correction method (94.8%±5.6), bandpass filtering (88.5%±14.4), detrending (93%±9.6), and wavelet (87.8%±14).

These results confirmed that the envelope method based on the baseline correction method has the highest performance.

The present disclosure classifies the types of blinks and eye movements using the EEG sensor-based EOG in an EEG head cap with a 10-20 system of 32 channels or more. It is expected that the same application will be possible in an actual BCI system using the corresponding EEG head cap.

In addition, we aimed to improve the blink error recognition through the EEG sensor-based EOG analysis and improve BCI performance by predicting eye movement direction, and the possibility of classifying the blink and four eye movements in the 10-20 system EEG head cap is confirmed. The blink, which is used to correct errors and perform specific commands in the actual BCI, can improve recognition errors that occur due to waveform patterns similar to other eye movements.

The present disclosure considered the possibility of classification in free eye movements by performing 5 types of classification in a total of 9 tasks (blink and eye movements in eight directions). In the case of SSVEP-based BCI, where the user's eye movement occurs depending on the location of the visual stimulus, by predicting the direction of the target stimulus that the user is looking at through the algorithm proposed in the present disclosure, it may be expected to be used as the additional information to improve the performance of the actual SSVEP-BCI system.

The use of the EEG sensor-based EOG can eliminate the inconvenience of attaching the additional EOG electrodes, and provide convenience to the BCI user by replacing the existing image-based eye tracking technology.

Next, a device for recognizing blink and eye movement based on EEG according to another embodiment of the present disclosure will be described.

FIG. 5 is a schematic flowchart of a system 200 for recognizing blink and eye movement based on EEG according to another embodiment of the present disclosure.

As illustrated in FIG. 5, the system 200 for recognizing blink and eye movement based on EEG according to an embodiment of the present disclosure includes an EEG head cap 110 to which three electrodes 111, 112, and 113 are connected, at least one processor 210, a memory 220, a communicator 230, an inputter/outputter 240, and a communication bus 250.

Since the three electrodes 111, 112, and 113 and the EEG head cap 110 have the same configuration as described with reference to FIG. 1, detailed description thereof will be omitted here.

The processor 210 may be a general-purpose central processing unit (CPU), a microprocessor, an application-specific integrated circuit (ASIC), or one or more integrated circuits for controlling program execution in the solution of the present application.

The memory 220 stores information for a swarm drone control system according to an embodiment of the present disclosure.

Specifically, the memory 220 is further configured to store a set of codes, which are used to control the processor 210 to execute the following processes. The processor includes a process of acquiring an EEG sensor-based EOG signal (hereinafter referred to as "EOG signal") from one center electrode 112 of the prefrontal lobe and two bilateral electrodes (left electrode and right electrode) 111 and 113 connected to the EEG head cap 110, a process of applying an envelope based baseline correction that minimizes signal loss for accurate analysis of the EOG signal, a process of performing potential blink detection and zero crossing detection using the EOG signal to which the an envelope based baseline correction is applied, a process of generating seven parameters when there is a potential blink index, a process of classifying the blink and up/down/left/right eye movements using seven parameters, a process for generating five parameters when there is no potential blink index, a process of classifying as one of the left or right eye movements when there is the index of the zero crossing using the five parameters, a process of classifying the eye movement as one of the upper/lower/left/right eye movements using the five parameters when there is no index of the zero crossing, etc.

Here, since the above-described seven parameters and five parameters have already been described above, detailed description thereof will be omitted here.

The memory 220 may be a read-only memory (ROM) or another type of static storage device that may store commands, a random access memory (RAM) or another type of dynamic storage device that may store information and commands, an electrically erasable programmable read-only memory (EEPROM), a compact disc read-only memory (CD-ROM) or other compact disk storage devices, an optical disk storage device (including a compressed optical disc, a laser disc, an optical disc, a digital versatile disc, a Blu-ray disc, etc.), a magnetic disk storage medium or other magnetic storage devices, or any other medium that may be accessed by a computer while carrying or storing expected program code in the form of commands or data structures, but is not limited thereto. The memory 220 may exist independently and is connected to the processor 210 by a communication bus 250.

The communicator 230 performs wired and wireless communication with the EEG head cap 110 and other external devices, and may be implemented by various wired or wireless communication technologies. For example, when the communicator 230 is connected to the Internet and provides a service, it may follow TCP/IP, a standard protocol for information transmission on the Internet.

The inputter/outputter 240 specifically includes an input device 241 and an output device 242, and the input device 241 may communicate with the processor 210 and receive user input in multiple ways. For example, the input device 241 may be a mouse, keyboard, a touch screen, or a sensing device. The output device 242 may communicate with the processor 210 and display information or output voice in multiple ways. For example, the output device 242 may be a liquid crystal display (LCD), a light emitting diode (LED) display, an organic light emitting diode (OLED) display, a speaker, etc.

The inputter/outputter 240 may be used to input information for recognizing blink and eye movement based on EEZ according to an embodiment and to display information for controlling recognition of blink and eye movement based on EEG, etc.

The communication bus 250 is configured to combine the components of the system 200 for recognizing blink and eye movement based on EEG, that is, the processor 210, the memory 220, the communicator 230, and the inputter/outputter 240.

The components or "units" used in the embodiments of the present disclosure may be implemented by software such as tasks, classes, sub-routines, processes, objects, execution threads, or programs performed in a predetermined region on a memory or hardware such as a field-programmable gate array (FPGA) or an application-specific integrated circuit (ASIC) and may be implemented by a combination of the software and the hardware. The components, the "~ unit", or the like, may be included in a computer readable storage medium or some of the components may be dispersed and distributed in a plurality of computers.

The drawings and detailed description of the present disclosure referred to so far are only examples of the present disclosure, which are only used for the purpose of explaining the present disclosure, but are used to limit the scope of the present disclosure described in the meaning or claims. Therefore, it will be understood by those skilled in the art that various modifications and equivalent other embodiments are possible therefrom. Accordingly, an actual technical scope of the present disclosure is to be defined by a technical spirit of the following claims.

What is claimed is:

1. A method for recognizing, by a system for recognizing blink and eye movement, blink and eye movement based on electroencephalogram (EEG), the method comprising:
measuring a subject's EEG-based electrooculogram (EOG) signal using three electrodes connected to an EEG head cap;
performing potential blink detection and zero crossing detection using the EOG signal;
generating a plurality of parameters used for blink and eye movement classification using the EOG signal depending on presence or absence of the potential blink and the zero crossing; and
classifying the blink and up/down/left/right eye movements using the plurality of parameters,
wherein the subject's blink and up/down/left/right eye movements are classified using the EOG signals measured through the three electrodes, and some of the blink and up/down/left/right eye movements are classified by comparing waveforms of at least two of the EOG signals,
wherein the generating of the plurality of parameters includes:
determining whether there is a potential blink index; and
generating seven parameters when there is the potential blink index, or generating five parameters when there is no potential blink index.

2. The method of claim 1, wherein:
the three electrodes include one center electrode attached to a center of a prefrontal lobe of a cerebral lobe of a subject's brain, one left electrode attached to a left side of the prefrontal lobe, and one right electrode attached to a right side of the prefrontal lobe.

3. The method of claim 2, wherein:
when the EOG signal measured through the center electrode is defined as F1, the EOG signal measured through the left electrode is defined as F2, the EOG signal measured through the right electrode is defined as F3, and an average value of F2 and F3 is defined as FT,
the seven parameters include
a parameter representing a variance of the F1 and FT,
a parameter representing a correlation between the F2 and F3,
a parameter representing a correlation between the F1 and F2 or F3,
a parameter representing a down variance of the F1 and FT,
a parameter representing a trapezoidal rule of the F1, F2 and F3,
a parameter representing maximum and minimum values of the F1 and the index, and
a parameter representing a total sum of the F2 and F3.

4. The method of claim 3, wherein:
in the classifying of the blink and the up/down/left/right eye movements,
the blink, the upper eye movement, and the lower eye movement are classified using the parameter representing the variance of the F1 and FT, the parameter representing the correlation between the F1 and F2 or F3, and the parameter representing the down variance of the F1 and FT, the parameter representing the trapezoidal rule of the F1, F2, and F3, and the parameter representing the maximum and minimum values of the F1 and the index.

5. The method of claim 3, wherein:
the left eye movement and the right eye movement are classified using the parameter representing the variance of the F1 and FT, the parameter representing the correlation between the F2 and F3, and the parameter representing the total sum of the F2 and F3.

6. The method of claim 2, wherein:
when the EOG signal measured through the center electrode is defined as F1, the EOG signal measured through the left electrode is defined as F2, the EOG signal measured through the right electrode is defined as F3, and an average value of F2 and F3 is defined as FT,
the five parameters include
a parameter representing a correlation between the F2 and F3,
a parameter representing a down variance of the F1 and FT,
a parameter representing maximum and minimum values of the F1 and the index,
a parameter representing a maximum difference value between the F2 and F3 and the index, and
a parameter representing a total sum of the F2 and F3.

7. The method of claim 6, wherein:
the classifying of the blink and the up/down/left/right eye movements further includes determining whether there is the index of the zero crossing, and
when there is the index of the zero crossing, the left eye movement and the right eye movement are classified using the parameter representing the total sum of the F2 and F3.

8. The method of claim 7, wherein:
when there is no index of the zero crossing, the upper eye movement, the lower eye movement, the left eye movement, and the right eye movement are classified using the parameter representing the correlation between the F2 and F3, the parameter representing the down variance of the F1 and FT, the parameter representing the maximum and minimum values of the F1 and the index, the parameter representing the maximum difference value between the F2 and F3 and the index, and the parameter representing the total sum of the F2 and F3.

9. The method of claim 1, further comprising:
between the measuring of the EOG signal and the performing of the zero crossing detection,
applying an envelope based baseline correction to the EOG signal.

10. A system for recognizing blink and eye movement based on electroencephalogram (EEG), the system comprising:
three electrodes attached to a prefrontal lobe of a cerebral lobe of a subject's brain to measure a subject's EEG-based electrooculogram (EOG) signal,
an EEG head cap connected to the three electrodes and transmitting the EOG signal measured through the three electrodes to an outside through wired or wireless communication, and
a recognition device performing potential blink detection and zero crossing detection using the EOG signal transmitted from the EEG head cap, generating a plurality of parameters used for the blink and eye movement classification using the EOG signal depending on presence or absence of the potential blink and the zero crossing, and classifying the blink and up/down/left/right eye movements using the plurality of parameters, wherein the recognition device classifies the subject's blink and up/down/left/right eye movements using the EOG signals measured through the three electrodes and classifies some of the blink and up/down/left/right eye movements by comparing waveforms of at least two of the EOG signals, and wherein the recognition device includes a processor and a memory configured to store a set of codes, wherein the code is used to control the processor to further execute:

a process of determining whether there is a potential blink index, and a process of generating seven parameters when there is the potential blink index, or generating five parameters when there is no potential blink index.

11. The system of claim 10, wherein:

the three electrodes include one center electrode attached to a center of the prefrontal lobe, one left electrode attached to a left side of the prefrontal lobe, and one right electrode attached to a right side of the prefrontal lobe.

12. The system of claim 11, wherein:

the code is used to control the processor to execute a process of performing potential blink detection and zero crossing detection using the EOG signal transmitted from the EEG head cap, a process of generating a plurality of parameters used for the blink and eye movement classification using the EOG signal depending on presence or absence of the potential blink and the zero crossing, and a process of classifying the blink and up/down/left/right eye movements using the plurality of parameters.

13. The system of claim 11, wherein:

when the EOG signal measured through the center electrode is defined as F1, the EOG signal measured through the left electrode is defined as F2, the EOG signal measured through the right electrode is defined as F3, and an average value of F2 and F3 is defined as FT, the seven parameters include a parameter representing a variance of the F1 and FT;

a parameter representing a correlation between the F2 and F3, a parameter representing a correlation between the F1 and F2 or F3, a parameter representing a down variance of the F1 and FT;

a parameter representing a trapezoidal rule of the F1, F2 and F3, a parameter representing maximum and minimum values of the F1 and the index, and a parameter representing a total sum of the F2 and F3.

14. The system of claim 11, wherein:

when the EOG signal measured through the center electrode is defined as F1, the EOG signal measured through the left electrode is defined as F2, the EOG signal measured through the right electrode is defined as F3, and an average value of F2 and F3 is defined as FT, the five parameters include a parameter representing the correlation between the F2 and F3, a parameter representing a down variance of the F1 and FT;

a parameter representing maximum and minimum values of the F1 and the index, a parameter representing a maximum difference value between the F2 and F3 and the index, and a parameter representing a total sum of the F2 and F3.

* * * * *